(12) United States Patent
Mathison et al.

(10) Patent No.: US 10,548,045 B2
(45) Date of Patent: Jan. 28, 2020

(54) SYSTEMS AND METHODS FOR TRACKING AND CALCULATING AGGREGATE MAXIMUM BIT RATE ACROSS MULTIPLE SESSIONS

(71) Applicant: Verizon Patent and Licensing Inc., Arlington, VA (US)

(72) Inventors: James Mathison, Warren, NJ (US); Barry F. Hoffner, Bridgewater, NJ (US)

(73) Assignee: Verizon Patent and Licensing I nc., Basking Ridge, NJ (US)

( * ) Notice: Subject to any disclaimer, the term of this patent is extended or adjusted under 35 U.S.C. 154(b) by 23 days.

(21) Appl. No.: 15/893,349

(22) Filed: Feb. 9, 2018

(65) Prior Publication Data
US 2019/0253916 A1   Aug. 15, 2019

(51) Int. Cl.
*H04W 28/02* (2009.01)
*H04W 4/70* (2018.01)
*H04W 28/12* (2009.01)

(52) U.S. Cl.
CPC ......... *H04W 28/0257* (2013.01); *H04W 4/70* (2018.02); *H04W 28/12* (2013.01)

(58) Field of Classification Search
None
See application file for complete search history.

(56) References Cited

U.S. PATENT DOCUMENTS

| 2009/0245108 A1* | 10/2009 | Wu | H04L 47/10 370/233 |
| 2015/0033311 A1* | 1/2015 | Seed | H04W 4/70 726/7 |
| 2015/0124607 A1* | 5/2015 | Kotecha | H04W 72/1242 370/235 |
| 2018/0035399 A1* | 2/2018 | Xu | H04W 4/70 |

* cited by examiner

Primary Examiner — Robert M Morlan

(57) ABSTRACT

A system described herein may allow for an Aggregate Maximum Bit Rate ("AMBR") to be applied across multiple sessions. Using such techniques can allow multiple different traffic types (e.g., as denoted by a Data Network Name ("DNN")) to share an AMBR. Additionally, an AMBR can be calculated, tracked, and enforced across multiple sessions associated with multiple devices. Some techniques may cause a particular Session Management Function ("SMF") to be selected when establishing a session, such that the SMF can calculate, track, and enforce the AMBR across multiple sessions that are in the same AMBR group.

20 Claims, 7 Drawing Sheets

| DNN | AMBR | AMBR Group |
|---|---|---|
| IP | 10Mbps | IP+IMS |
| IMS | 10Mbps | IP+IMS |
| Enterprise | 10Mbps | Enterprise |
| Streaming | 8Mbps | <null> |

605

| DNN | AMBR | AMBR Group |
|---|---|---|
| IP | 10Mbps | IP+IMS |
| IMS | 10Mbps | IP+IMS |
| Enterprise | 10Mbps | Enterprise_A |
| Streaming | 8Mbps | <null> |

AMBR information for UE 305-1

610

| DNN | AMBR | AMBR Group |
|---|---|---|
| IP | 10Mbps | IP+IMS |
| IMS | 10Mbps | IP+IMS |
| Enterprise | 15Mbps | Enterprise_B |
| Streaming | 12Mbps | Streaming_B |

AMBR information for UE 305-2

FIG. 6

SYSTEMS AND METHODS FOR TRACKING AND CALCULATING AGGREGATE MAXIMUM BIT RATE ACROSS MULTIPLE SESSIONS

BACKGROUND

Wireless telecommunications networks (e.g., Long-Term Evolution ("LTE") networks) may implement policies whereby user equipment ("UE") devices, such as mobile telephones, may have an Aggregate Maximum Bit Rate ("AMBR"). The AMBR for a particular UE may be tracked, calculated, and enforced, for example, on a per-session basis, where each session may be associated with a type of traffic (e.g., Internet Protocol ("IP") traffic, IP Multimedia Subsystem ("IMS") traffic, etc.).

BRIEF DESCRIPTION OF THE DRAWINGS

FIG. 6 illustrates example data structures that may be used to enforce an AMBR across multiple sessions that are associated with more than one UE;

DETAILED DESCRIPTION OF THE PREFERRED EMBODIMENTS

The following detailed description refers to the accompanying drawings. The same reference numbers in different drawings may identify the same or similar elements.

Telecommunications networks, such as wireless telecommunications networks, may utilize an AMBR for a variety of reasons, such as network congestion control, subscriber level agreements ("SLAs"), and/or other reasons. Typically, an AMBR may be enforced on a per-PDU session basis, where a PDU session relates to a particular type of traffic. For instance, a UE may be engaged in one PDU session for traffic marked as "IP" traffic, and another PDU session for traffic marked as "IMS" traffic. This type of implementation may be too inflexible for situations where certain "similar" types of traffic are associated with different PDU sessions. For example, in some systems, IPv4 traffic and IPv6 traffic may be handled via a single IPv4v6 stack, and may thus be handled on the same PDU session. In other systems, however, IPv4 traffic and IPv6 traffic may be handled across separate PDU sessions. This situation is further elaborated on in FIGS. 1 and 2.

Figure 1:
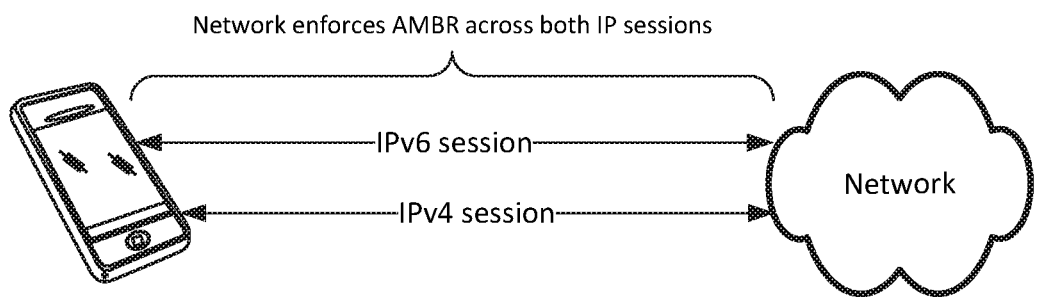
FIG. 1 illustrate an example overview of one or more embodiments described herein, in which an AMBR is enforced across multiple sessions.

As shown in FIG. 1, a UE may be engaged in an IPv4 session and an IPv6 session with a network (e.g., a wireless telecommunications network). Further assume that the UE is intended to be associated with an AMBR for IP traffic. That is, the AMBR may not distinguish between IPv4 and IPv6. Further, this distinction may not be significant for the purposes of establishing the AMBR. For instance, the UE may be associated with a subscription that specifies an AMBR for IP traffic (i.e., as opposed to an AMBR for IPv4 traffic and an AMBR for IPv6 traffic).

In accordance with implementations described in more detail herein, the network may calculate, track, and enforce the AMBR for IP traffic, for the UE, across both the IPv4 session and the IPv6 session. Assume, for instance, that the AMBR for IP traffic is 10 megabits per second ("Mbps"). The total cumulative throughput for both the IPv4 and IPv6 sessions may thus be 10 Mbps, which may be consistent with the desired AMBR for IP traffic.

Figure 2:
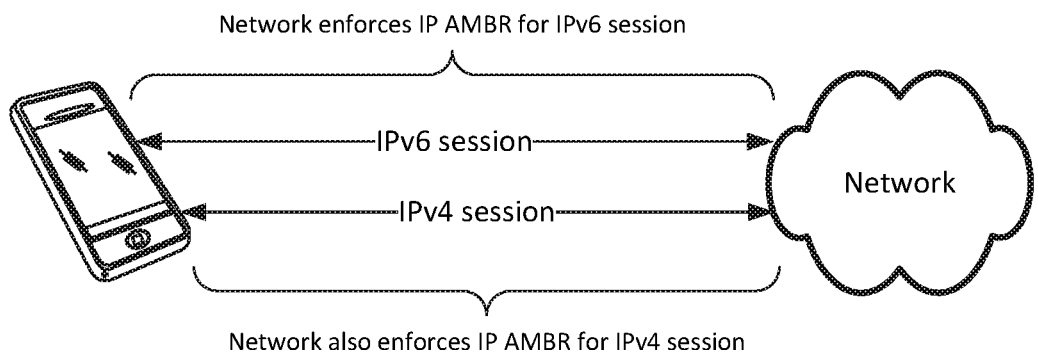
FIG. 2 illustrates a previously available technique, in which AMBR for similar traffic is separately enforced over multiple sessions.

FIG. 2 illustrates an example in which AMBRs are calculated, tracked, and enforced solely on a per-session basis. Assume, as in FIG. 1, that the UE is engaged in an IPv4 session and an IPv6 session with the network, and further that the AMBR for IP traffic, for the UE, is 10 Mbps. Since the AMBR for IP traffic is 10 Mbps, the network may enforce the 10 Mbps AMBR for the IPv4 session, and may separately enforce the 10 Mbps AMBR for the IPv6 session. In some situations, this may result into up to 20 Mbps being consumed by the UE for IP traffic (i.e., 10 Mbps for the IPv4 traffic and 10 Mbps for the IPv6 traffic). Another potential solution may involve a heuristic approach where the AMBR for IP traffic is split into separate AMBRs for IPv4 and IPv6 traffic. For instance, the network may enforce a 5 Mbps AMBR for IPv4 traffic and a 5 Mbps ABR for IPv6 traffic. This may result in an undesirable scenario where, for example, IPv4 traffic is capped at 5 Mbps, while IPv6 traffic is consuming well under 5 Mbps.

Systems and/or methods, as described herein, may provide for the calculation, tracking, and enforcement of an AMBR across multiple sessions. The multiple sessions may correspond to multiple types of traffic (e.g., IPv4 traffic and IPv6 traffic, as discussed with respect to FIG. 1). In some embodiments, the multiple sessions may additionally, or alternatively, be sessions associated with multiple UEs. For example, as described in more detail below, the network may calculate, track, and enforce a shared AMBR across multiple devices (e.g., machine-to-machine ("M2M") devices). The AMBR enforcement across multiple sessions, as described herein, may provide flexibility in network design and/or policy enforcement, as multiple types of traffic can be treated equally for the purposes of enforcing maximum bit rates. The techniques described herein are also more dynamic than heuristic-based approaches (e.g., splitting up a total desired AMBR into separate AMBRs for different traffic types, such as the 5 Mbps AMBR scenario described above).

Figure 3:
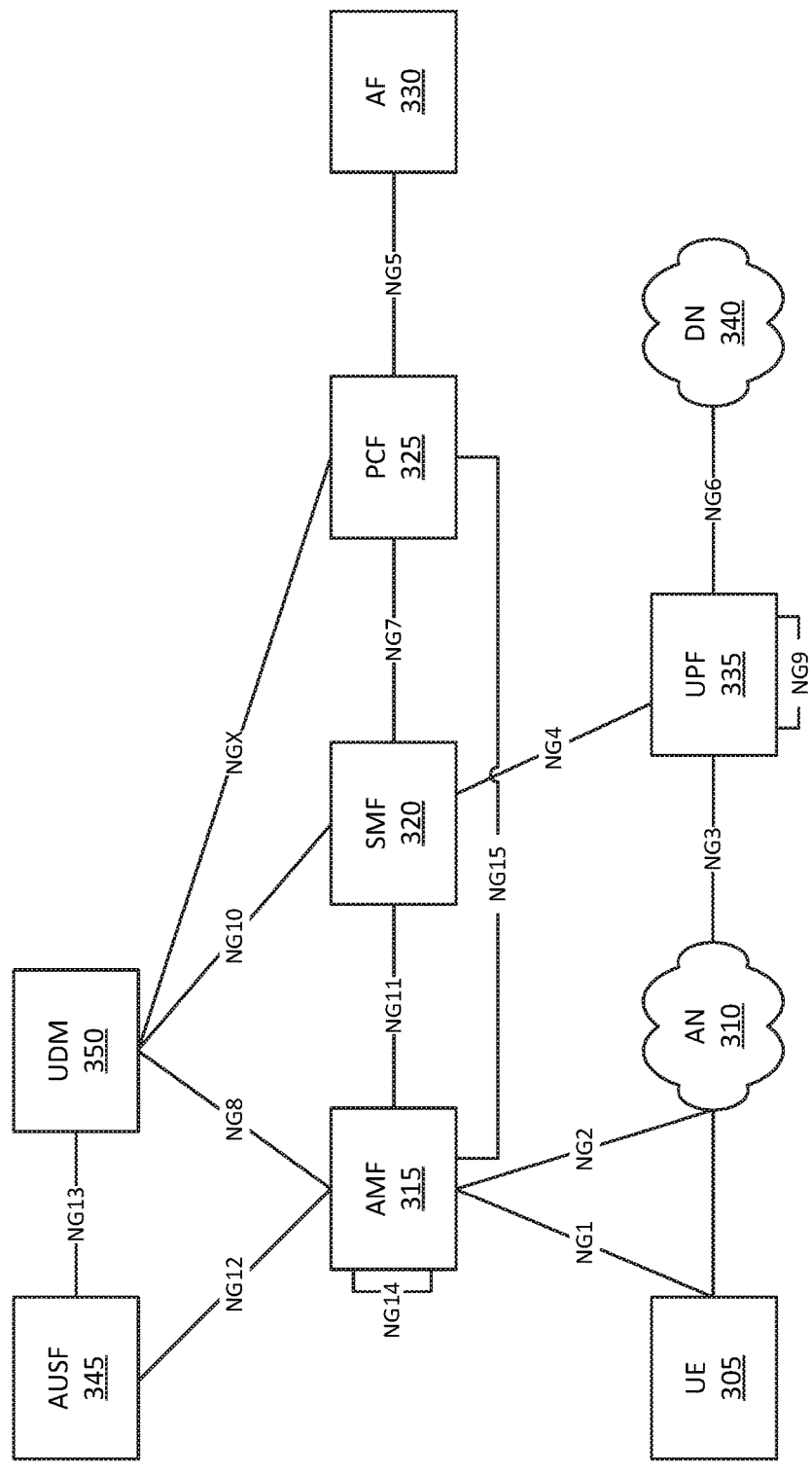
FIG. 3 illustrates an example environment in which one or more embodiments, described herein, may be implemented.

FIG. 3 illustrates an example environment 300, in which one or more embodiments, described herein, may be implemented. Generally speaking, environment 300 may be a 5G network, and/or may include elements of a 5G network. The representation shown in FIG. 3 may be a reference point representation of the 5G network, in which the interactions between various network functions are shown. These interactions are represented here as interfaces NG1 through NG15, and NGX. It may be possible to represent environment 300 in other ways (e.g., a service-based representation), but these other representations are not provided herein for the sake of brevity.

As shown in FIG. 3, environment 300 may include UE 305, access network ("AN") 310, Access and Mobility Management Function ("AMF") 315, Session Management Function ("SMF") 320, Policy Control Function ("PCF") 325, Application Function ("AF") 330, User Plane Function ("UPF") 335, Data Network ("DN") 340, Authentication Server Function ("AUSF") 345, and Unified Data Management ("UDM") 350.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

UE 305 may include any computation and communication device that is capable of communicating with one or more networks (e.g., AN 310 and/or DN 340). For example, user device 305 may include a device that receives content, such as web pages (e.g., that include text content and/or image content), streaming audio and/or video content, and/or other content, via an Internet connection and/or via some other delivery technique. In some implementations, user device 305 may be, may include, or may be a logical portion of, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

AN 310 may be, or may include, a 5G RAN that includes one or more base stations, via which UE 305 may communicate with one or more other elements of environment 300. UE 305 may communicate with the RAN via an air interface. For instance, AN 310 may receive traffic (e.g., voice call traffic, data traffic, messaging traffic, signaling traffic, etc.) from UE 305 via the air interface, and may communicate the traffic to AMF 315, UPF 335, and/or one or more other devices or networks. Similarly, AN 310 may receive traffic intended for UE 305 (e.g., from AMF 315, UPF 335, and/or one or more other devices or networks) and may communicate the traffic to UE 305 via the air interface.

AMF 315 may include one or more computation and communication devices that perform operations to register UE 305 with the 5G network, to establish bearer channels associated with a session with UE 305, to hand off UE 305 from the 5G network to another network, to hand off UE 305 from the other network to the 5G network, and/or to perform other operations. In some embodiments, the 5G network may include multiple AMFs 315, which communicate with each other via the NG14 interface (denoted in FIG. 3 by the line marked "NG14" originating and terminating at AMF 315).

As described in more detail below, AMF 315 may aid in the calculating, tracking, and enforcement of AMBRs (e.g., AMBRs specified by AMBR groups, on a per-traffic type and/or per-device basis). For instance, AMF 315 may aid in the identification of a particular SMF 320 that is handling a session associated with a particular traffic type and/or UE 305. Additionally, AMF 315 may cause AN 310 to enforce AMBRs, at the AN level, specified by AMBR group information.

SMF 320 may include one or more network devices that gather, process, store, and/or provide information in a manner described herein. SMF 320 may, for example, facilitate in the establishment of communication sessions on behalf of UE 305. In some embodiments, the establishment of communications sessions may be performed in accordance with one or more policies provided by PCF 325. As described herein, SMF 320 may also monitor parameters associated with traffic sent to and/or received from UE 305. For instance, SMF 320 may monitor resources consumed by UE 305 (e.g., where the resources correspond to voice call minutes used by UE 305, amounts of data sent and/or received by UE 305, quantities of messages (e.g., SMS, MMS, and/or other types of messages) sent and/or received by UE 305, or the like). SMF 320 may perform the monitoring by, for example, communicating with UPF 335 (e.g., via the NG4 interface) regarding user plane data that has been processed by UPF 335.

As described in more detail below, SMF 320 may aid in the calculating, tracking, and enforcement of AMBRs (e.g., AMBRs specified by AMBR groups, on a per-traffic type and/or per-device basis). For instance, SMF 320 may cause UPF 335 to enforce AMBRs, at the UPF level, specified by AMBR group information.

PCF 325 may include one or more devices that aggregate information to and from the 5G network and/or other sources. PCF 325 may receive information regarding policies and/or subscriptions from one or more sources, such as subscriber databases and/or from one or more users (such as, for example, from UDM 350 via the NGX interface or from an administrator associated with PCF 325). PCF 325 may provide the policy information to SMF 320 via the NG7 interface.

AF 330 may include one or more devices that receive, store, and/or provide information that may be used in determining parameters (e.g., quality of service parameters, charging parameters, or the like) for certain applications. AF 330 may maintain the information on a per-application basis, in some embodiments.

UPF 335 may include one or more devices that receive, store, and/or provide data (e.g., user plane data). For example, UPF 335 may receive user plane data (e.g., voice call traffic, data traffic, etc.), destined for UE 305, from DN 340, and may forward the user plane data toward UE 305 (e.g., via AN 310, SMF 320, and/or one or more other devices). In some embodiments, multiple UPFs 335 may be deployed (e.g., in different geographical locations), and the delivery of content to UE 210 may be coordinated via the NG9 interface (e.g., as denoted in FIG. 3 by the line marked "NG9" originating and terminating at UPF 335). Similarly, UPF 335 may receive traffic from UE 210 (e.g., via AN 310, SMF 320, and/or one or more other devices), and may forward the traffic toward DN 340. In some embodiments, UPF 335 may communicate (e.g., via the NG4 interface) with SMF 320, regarding user plane data processed by UPF 335. As mentioned above, this information may aid SMF 320 in monitoring the traffic for particular subscribers.

DN 340 may include one or more wired and/or wireless networks. For example, DN 340 may include an Internet Protocol ("IP")-based PDN, a wide area network ("WAN") such as the Internet, a private enterprise network, and/or one or more other networks. UE 305 may communicate, through DN 340, with data servers, application servers, other UEs 305, and/or to other servers or applications that are coupled to DN 340. DN 340 may be connected to one or more other networks, such as a public switched telephone network ("PSTN"), a public land mobile network ("PLMN"), and/or another network. DN 340 may be connected to one or more devices, such as content providers, applications, web servers, and/or other devices, with which UE 305 may communicate.

AUSF 345 and UDM 350 may include one or more devices that manage, update, and/or store, in one or more memory devices associated with AUSF 345 and/or UDM 350, profile information associated with a subscriber. AUSF 345 and/or UDM 350 may perform authentication, authorization, and/or accounting operations associated with the subscriber and/or a communication session with UE 305.

In accordance with some embodiments, UDM 350 may store information regarding AMBR groups, which may be used to specify desired AMBRs for sets of devices and/or types of traffic, as described herein. UDM 350 may provide some or all of the stored information regarding AMBR groups to PCF 325, to facilitate the calculation, tracking, and enforcement of the AMBRs by PCF 325 and/or other devices.

Figure 4:
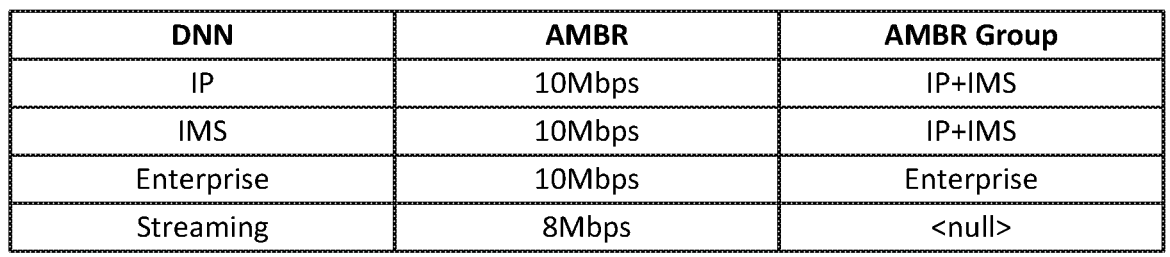
FIG. 4 illustrates an example data structure that may be used to enforce an AMBR across multiple sessions.

FIG. 4 illustrates an example data structure 400 that may be used to specify AMBR groups for a particular UE 305. In some embodiments, different instances of data structure 400 may be associated with different UEs 305. In some embodiments, data structure 400 may be stored by, and/or may conceptually represent information stored by, UDM 350, PCF 325, AMF 315, and/or SMF 320. While data structure 400 is shown as a table, data structure 400 may be implemented as an array, a linked list, a hash table, a tree, and/or some other suitable data structure.

As shown, data structure 400 may include information regarding data network names ("DNNs"), AMBRs, and AMBR groups. A DNN may correspond to a particular traffic type. The example traffic types (DNNs) shown in FIG. 4 include IP, IMS, Enterprise, and Streaming traffic types. As discussed below, particular traffic, to and/or from a particular UE 305, may indicate a particular DNN with which the traffic is associated.

The AMBR, for a particular DNN, may indicate the AMBR that should be enforced for that particular DNN. Further, the AMBR group, for a particular DNN, may indicate a particular AMBR group to which that DNN belongs. For instance, as shown in FIG. 4, the IP and IMS DNNs may both be associated with the AMBR group called "IP+IMS." As further shown, the AMBRs for these traffic types (e.g., the AMBR for the AMBR group "IP+IMS") may be 10 Mbps. Thus, in accordance with some embodiments, the AMBR for traffic, for this particular UE 305, which corresponds to the IP and/or IMS DNNs may be enforced together. That is, for instance, the cumulative AMBR for both IP and IMS traffic, for UE 305, may be 10 Mbps.

As further shown in FIG. 4, the DNN "Enterprise" may have an AMBR of 10 Mbps, and may be in a different AMBR group from the IP and IMS DNNs. Thus, the AMBR for Enterprise traffic may be calculated, tracked, and enforced separately from the cumulative AMBR calculated, tracked, and enforced for IP and IMS traffic. As also shown, not all DNNs are required to belong to an AMBR group. For example, the Streaming DNN is not in an AMBR group (as denoted by "<null>" in the AMBR group field for the Streaming DNN).

Figure 5:
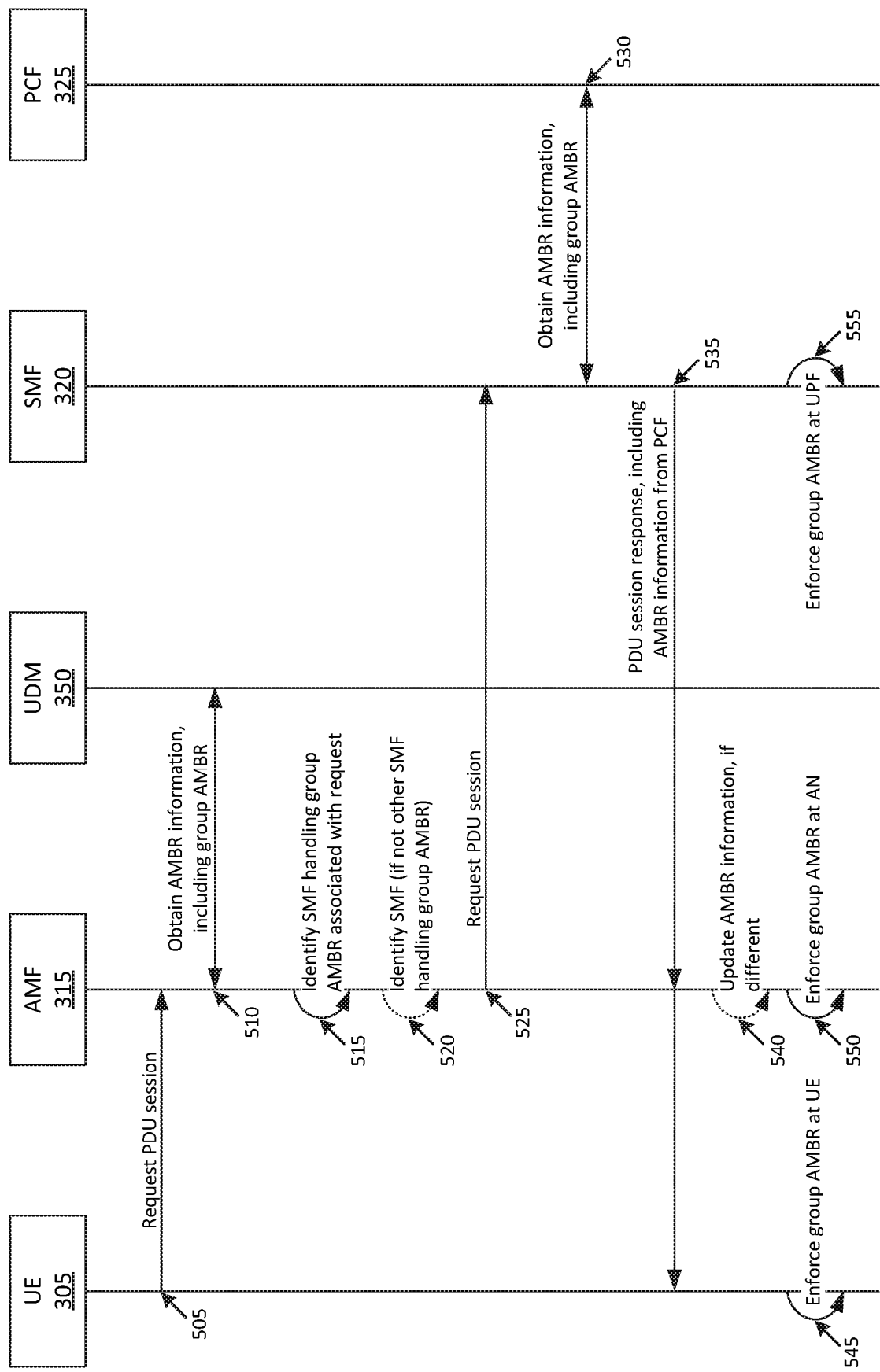
FIG. 5 illustrates an example signal flow that may be used to enforce an AMBR across multiple sessions.

FIG. 5 illustrates an example signal flow for enforcing AMBR on a group basis. As shown, UE 305 may request (at 505) a PDU session, and AMF 315 may receive this request. This request may include information specifying a DNN, and/or may include information from which AMF 315 may determine a DNN associated with the request. AMF 315 may obtain (at 510) policy information by requesting the policy information from UDM 350. The requested information may, in some embodiments, include information regarding AMBR groups (e.g., as similarly discussed above with respect to FIG. 4).

AMF 315 may also identify (at 515) whether an SMF 320 is currently involved in a PDU session with UE 305 for the requested DNN. For example, the network may include multiple SMFs 320 (which may be, for example, geographically distributed). Thus, out of a set of candidate SMFs 320 of the network, AMF 315 may select a particular SMF 320 that is currently handling a PDU session with the UE for the requested DNN. If no SMFs 320 are currently handling a PDU session with the UE for the requested DNN, then an SMF 320 may be selected (at 520) for the requested PDU session using a suitable process.

Once an SMF 320 has been selected, AMF 315 may output (at 525) a PDU session request to SMF 320. The selected SMF 320 may obtain (at 530) AMBR information, including group AMBR information, associated with UE 305, from PCF 325. For instance, SMF 320 may output a request to PCF 325, requesting the AMBR information and/or other types of information from PCF 325 (e.g., policy information, quality of service ("QoS") information, etc.).

PCF 325 may determine the AMBR groups associated with UE 305, and may also determine other policy information associated with UE 305. In some embodiments, PCF 325 may simply identify previously stored AMBR group information provided by UDM 350. In some embodiments, PCF 325 may modify the AMBR group information based on other policies, based on usage associated with UE 305, based on network conditions, etc. For instance, assume that PCF 325 determines that UE 305 is associated with a 10 Mbps AMBR for the AMBR group "IP+IMS" (e.g., as shown in FIG. 4). However, further assume that PCF 325 determines that UE 305 has exceeded a threshold amount of data used for a particular time period (e.g., over 50 GB of overall data, or of IP and IMS data, transferred to and/or from UE 305 within a given month). PCF 325 may further modify the AMBR for the "IP+IMS" AMBR group, for UE 305, based on determining that UE 305's usage has exceeded this threshold. For instance, PCF 325 may set the AMBR for the "IP+IMS" AMBR group, for UE 305, to 7 Mbps instead of 10 Mbps.

As another example, assume that PCF 325 receives information indicating that the network is congested (e.g., AMF 315, AN 310, SMF 320, and/or UPF 335 are handling greater than a threshold amount of traffic). PCF 325 may modify the AMBR for the "IP+IMS" AMBR group, for UE 305, based on a measure of congestion of the network. As another example, assume that PCF 325 receives information indicating that the network is relatively uncongested (e.g., AMF 315, AN 310, SMF 320, and/or UPF 335 are handling less than a threshold amount of traffic). In this situation, PCF 325 may increase the AMBR for the "IP+IMS" AMBR group (e.g., to 12 Mbps instead of 10 Mbps).

Once SMF 320 receives the AMBR information from PCF 325, SMF 320 may store the obtained information and output (at 535) a PDU session response to AMF 315, indicating that the PDU session request has been granted. The PDU session response may also include the AMBR information received from PCF 325. AMF 315 may also forward the AMBR information to UE 305.

In some scenarios, the established PDU session may correspond to the same DNN that is associated with one or more other PDU sessions associated with UE 305. In other words, UE 305 may have multiple active PDU sessions for the same DNN (or for the same set of DNNs that are associated with a particular AMBR group). Due to the identification (performed at 515), the same SMF 320 may handle all PDU sessions that correspond to the same DNN or set of DNNs that are associated with a particular AMBR group. For example, the same SMF 320 may handle a first PDU session for UE 305, that corresponds to an IP DNN, and may also handle a second PDU session for UE 305, that corresponds to an IMS DNN (in the example scenario where the IP and IMS DNNs are in the same AMBR group for UE 305).

The AMBR, indicated by the AMBR group associated with the DNN of the established PDU session, may be enforced by UE 305 (at 545), AMF 315 (at 550), and/or SMF 320 (at 555). For instance, when outputting traffic, UE 305 may enforce the AMBR for the DNNs of the AMBR group (e.g., may prevent traffic that exceeds the AMBR from being outputted by UE 305). As an example, assume that a first application, executed at UE 305, attempts to output IPv4 traffic (i.e., associated with the IP DNN) at the rate of 7 Mbps, and a second application, also executed at the UE 305, concurrently attempts to output IPv6 traffic (i.e., also associated with the IP DNN) at the rate of 7 Mbps. In this example situation, UE 305 may determine that the total attempted bitrate for traffic associated with the IP DNN (e.g., in the "IP+IMS" AMBR group) is 14 Mbps, which is 4 Mbps higher than the allowed AMBR. UE 305 may, itself, perform throttling or other suitable operations to enforce the AMBR associated with the "IP+IMS" AMBR group (i.e., may limit the bitrate of the outgoing traffic from the first and second applications to 10 Mbps). By enforcing the AMBR at the UE level, processing and/or network resources (e.g., associated with AN 310, AMF 315, SMF 320, and/or UPF 335) may be conserved, as other devices in the network may not need to perform this enforcement.

Additionally, or alternatively, AMF 315 may calculate, track, and enforce (at 550) the AMBR at the AN level. For example, when AN 310 receives traffic from UE 305, AMF 315 may cause AN 310 to throttle and/or otherwise limit the bitrate of the traffic when the traffic exceeds the allowed AMBR. For example, assume that that AN 310 receives IPv4 traffic from UE 305 at the rate of 7 Mbps and also receives IMS traffic from UE 305 at the rate of 7 Mbps (i.e., 14 Mbps, or 4 Mbps higher than the allowed AMBR of 10 Mbps for the "IP+IMS" AMBR group). AMF 315 may cause AN 310 to only allow 10 Mbps of this traffic to be propagated to the rest of the network. Enforcing the AMBR at the AN level may be useful in situations where UE 305 does not enforce the AMBR.

Enforcing the AMBR at the AN level may further be useful in situations where multiple UEs 305 are in the same AMBR group. FIG. 6 illustrates data structures 605 and 610, which may conceptually illustrate AMBR groups respectively associated with two example UEs: UE 305-1 and UE 305-2. As with data structure 400, data structures 605 and/or 610 may be stored by, and/or may conceptually represent information stored by, AMF 315, SMF 320, PCF 325, and/or UDM 350. Data structure 605 may represent AMBR information for UE 305-1, and data structure 610 may represent AMBR information for UE 305-2.

As shown, both UE 305-1 and UE 305-2 may be associated with the "IP+IMS" AMBR group. Additionally, UE 305-1 may be associated with one AMBR group for traffic having the Enterprise DNN (i.e., the "Enterprise A" AMBR group), while UE 305-2 is associated with another AMBR group for traffic also having the Enterprise DNN (i.e., the "Enterprise B" AMBR group). Thus, traffic having the Enterprise DNN may be calculated, tracked, and enforced separately for the two UEs 305-1 and 305-2, but IP and IMS traffic for both UEs 305-1 and 305-2 may be calculated, tracked, and enforced together. For example, referring back to FIG. 5, AMF 315 may determine that UE 305-1 is attempting to output IP traffic at 7 Mbps and that UE 305-2 is attempting to output IP traffic at 8 Mbps (for a total of 15 Mbps, or 5 Mbps higher than the allowed AMBR of 10 Mbps for the "IP+IMS" AMBR group). AMF 315 may cause AN 310 to only allow 10 Mbps of this traffic (i.e., a cumulative 10 Mbps, across both UEs 305-1 and 305-2) to be propagated to the rest of the network.

Returning to FIG. 5, SMF 320 may calculate, track, and enforce (at 555) the AMBR at the UPF level (e.g., may cause UPF 335 to calculate, track, and enforce the AMBR for UE 305 and/or one or more other UEs in the same AMBR group as UE 305, in a similar fashion as discussed above). It may be advantageous for SMF 320 to calculate, track, and enforce the AMBR, across multiple sessions (e.g., across multiple DNNs and/or multiple UEs 305), in situations where multiple ANs 310 are used to transport traffic from one or more UEs 305. For instance, assume that two UEs 305 are associated with the same AMBR group, but are located in geographically distinct locations (e.g., different counties, cities, or states). Additionally, SMF 320 may calculate, track, and enforce the AMBR associated with one or more UEs 305, according to AMBR groups, in the downlink direction (e.g., traffic that is destined for UE 305).

Figure 7:
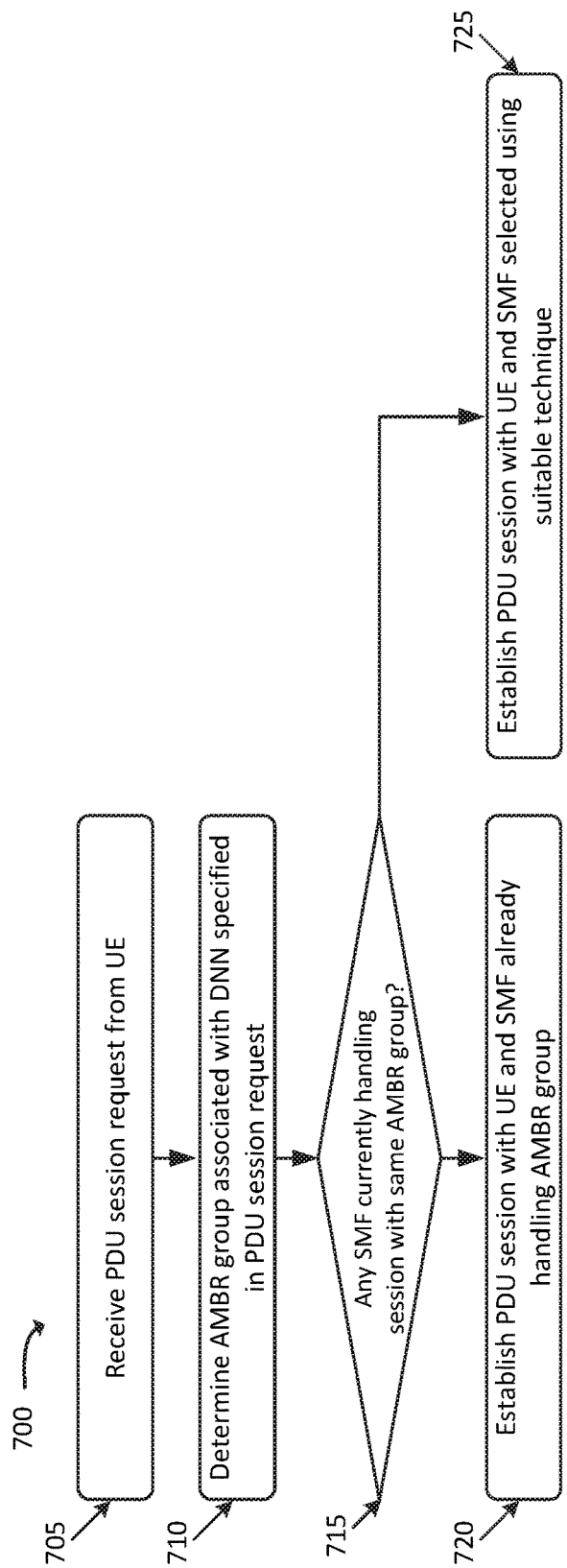
FIG. 7 illustrates an example process for establishing a protocol data unit ("PDU") session in a manner that facilitates the enforcement of an AMBR across multiple sessions.

FIG. 7 illustrates an example process 700 for facilitating the establishment of a PDU session in a manner that allows AMBR to be calculated, tracked, and enforced across multiple sessions (e.g., as similarly discussed above with respect to FIG. 5). In some embodiments, process 700 may be performed by AMF 315 and/or one or more other devices.

As shown, process 700 may include receiving (at 705) a PDU session request from a UE. As mentioned above, the PDU session request may indicate a DNN associated with the requested PDU session.

Process 700 may also include determining (at 710) an AMBR group associated with the DNN specified in the PDU session request. For example, as discussed above, SMF 315 may receive policy information (e.g., from PCF 325) that indicates one or more AMBR groups with which UE 305 is associated. The information may specify one or more DNNs that are included in the AMBR groups, as well an AMBR associated with each AMBR group. SMF 315 may use this policy information to determine an AMBR group associated with the DNN specified in the PDU session request.

Process 700 may further include determining (at 715) whether any SMFs are currently handling a session with the same AMBR group associated with the DNN specified in the PDU session request. If an SMF 320 is currently handling any sessions associated with the same AMBR group (at 715—YES), then process 700 may include establishing (at 720) a PDU session with UE 305 and the SMF 320 that has been determined as already handling one or more sessions associated with the AMBR group. If, on the other hand, no SMFs 320 have been determined as handling any sessions associated with the same AMBR group (at 720—NO), then process 700 may include establishing (at 725) a PDU session with an SMF 320 selected using a suitable process.

Figure 8:
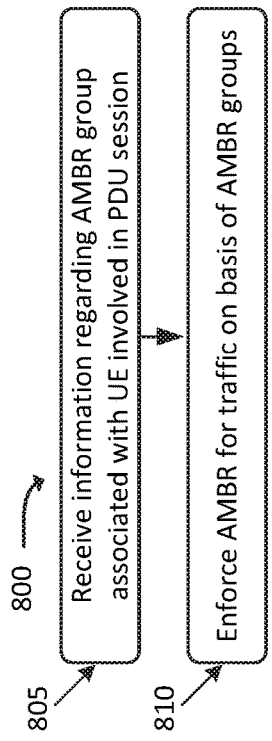
FIG. 8 illustrates an example process for enforcing an AMBR across multiple sessions.

FIG. 8 illustrates an example process 800 for enforcing the AMBR associated with one or more AMBR groups. In some embodiments, process 800 may be performed by UE 305, AMF 315, and/or SMF 320. For example, as similarly described above, UE 305 may perform process 800 to calculate, track, and enforce the AMBR for traffic sent by UE 305 itself (e.g., traffic outputted by one or more applications being executed by UE 305), AMF 315 may perform process 800 to calculate, track, and enforce the AMBR at the AN level, and SMF 320 may perform process 800 to calculate, track, and enforce process 800 at the UPF level. In some embodiments, UE 305, AMF 315, and SMF 320 may all perform process 800; while in some embodiments one or more of UE 305, AMF 315, or SMF 320 may not perform process 800.

As shown, process 800 may include receiving (at 805) information regarding an AMBR group associated with a UE involved in (e.g., communicating via) a PDU session. For example, UE 305, AMF 315, and/or SMF 320 may receive this information as part of the PDU session establishment process. The information may include policy information generated by PCF 325, as discussed above.

Process 800 may further include enforcing (at 810) the AMBR for traffic on the basis of the AMBR group information. For example, as similarly described above, UE 305 may enforce the AMBR for traffic outputted from UE 305, AMF 315 may calculate, track, and enforce the AMBR on the AN level, and SMF 320 may calculate, track, and enforce the AMBR at the UPF level. As further described above, the AMBR may be calculated, tracked, and enforced across multiple sessions (e.g., multiple sessions associated with the same AMBR group, involving either a single UE 305 or multiple UEs 305 that are included in the same AMBR group).

Figure 9:
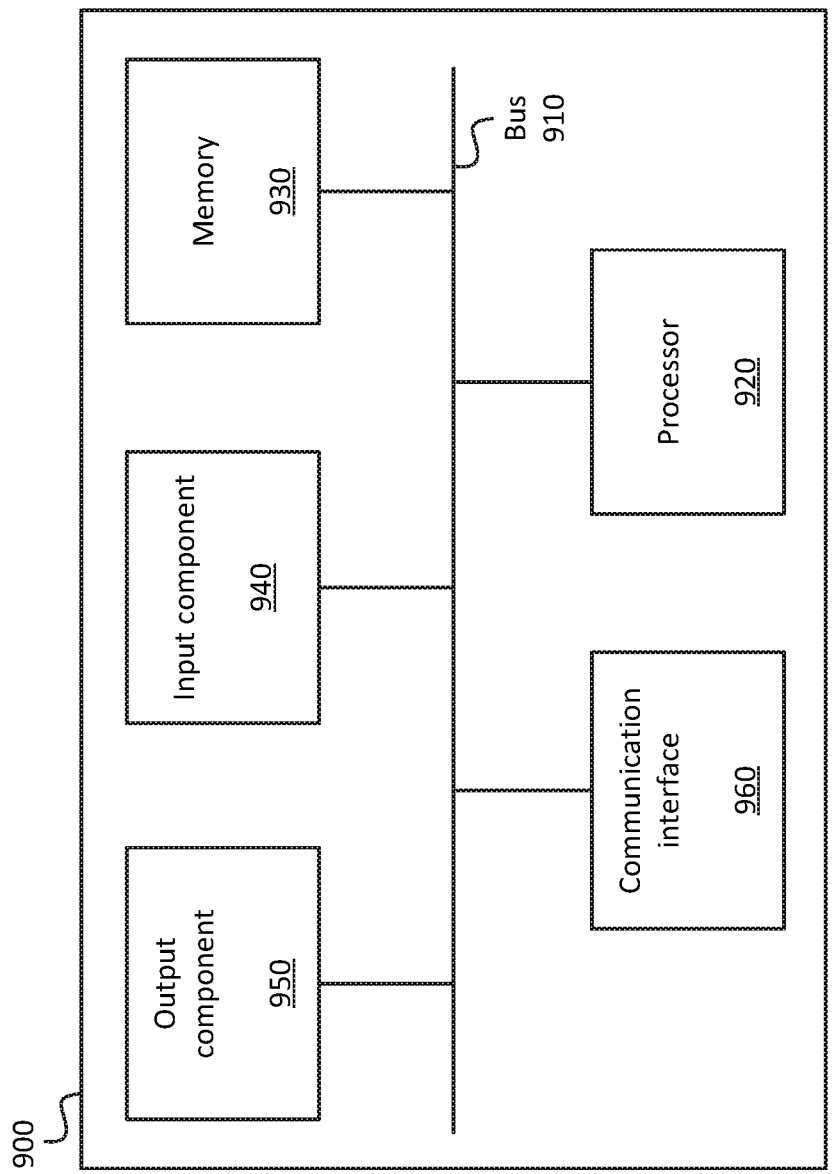
FIG. 9 illustrates example components of one or more devices, according to one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc. Input component 940 may include one or more input devices and/or sensors.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks have been described with regard to FIGS. 4 and 5, the order of the blocks may be modified in other implementations. Further, non-dependent blocks may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate con text.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
    a non-transitory computer-readable medium storing a set of processor-executable instructions; and
    one or more processors configured to execute the set of processor-executable instructions, wherein executing the set of processor-executable instructions causes the one or more processors to:
        receive information indicating that a user equipment ("UE") has requested that a session be established with a telecommunications network;
        identify a traffic type associated with the request;
        identify an Aggregate Maximum Bit Rate ("AMBR") group associated with the traffic type, wherein the AMBR group specifies:
            a plurality of traffic types, including the identified traffic type, and
            an AMBR to be enforced for the plurality of traffic types;
        identify that a particular Session Management Function ("SMF"), associated with the wireless telecommunications network, is handling traffic associated with the AMBR group;
        cause, based on identifying that the particular SMF is handling traffic associated with the AMBR group, the particular SMF to be selected when establishing the session associated with the UE;
        identify that the request has been granted and that the session has been established with the wireless telecommunications network; and
        enforce the AMBR across a plurality of sessions, the plurality of sessions including at least:
            the session that was granted based on the request, and
            at least one other session,
            wherein enforcing the AMBR across the plurality of sessions includes causing a cumulative bit rate, of traffic transmitted via the plurality of sessions, to be at or below the AMBR specified by the AMBR group.

2. The device of claim 1, wherein the processor-executable instructions, to enforce the AMBR across the plurality of sessions, causes the one or more processors to:
    enforce the AMBR across a plurality of sessions that are associated with at least two different traffic types that are associated with the AMBR group.

3. The device of claim 1, wherein the AMBR group is associated with the UE and at least one other UE,
    wherein the processor-executable instructions, to enforce the AMBR across the plurality of sessions, causes the one or more processors to enforce the AMBR across:
        the session that was granted based on the request, and
        at least one other session that is associated with the at least one other UE.

4. The device of claim 3, wherein the AMBR group is associated with a plurality of different traffic types, including the traffic type associated with the request,
    wherein the processor-executable instructions, to enforce the AMBR across the plurality of sessions, further causes the one or more processors to enforce the AMBR across:
        the plurality of different traffic types,
        the session associated with the UE, and
        at least one other session associated with the at least one other UE.

5. The device of claim 3, wherein the UE includes a first machine-to-machine ("M2M") device, and wherein the at least one other UE includes at least a second M2M device.

6. The device of claim 1, wherein the traffic type is specified in the request as a Data Network Name ("DNN").

7. The device of claim 1, wherein the AMBR is a first AMBR and the traffic type is a first traffic type, wherein executing the processor-executable instructions further causes the one or more processors to:
    identify another session, associated with the UE, that is associated with a second traffic type that is not specified by the AMBR group;
    identify a second AMBR associated with the second traffic type; and
    enforce the second AMBR, for the second session, separately from the enforcement of the first AMBR.

8. The device of claim 1, wherein the plurality of sessions include two or more sessions between the wireless telecommunications network and the UE.

9. A method, comprising:
receiving information indicating that a user equipment ("UE") has requested that a session be established with a wireless telecommunications network;
identifying a traffic type associated with the request;
identifying an Aggregate Maximum Bit Rate ("AMBR") group associated with the traffic type, wherein the AMBR group specifies:
a plurality of traffic types, including the identified traffic type, and
an AMBR to be enforced for the plurality of traffic types;
identifying that a particular Session Management Function ("SMF"), associated with the wireless telecommunications network, is handling traffic associated with the AMBR group;
causing, based on identifying that the particular SMF is handling traffic associated with the AMBR group, the particular SMF to be selected when establishing the session associated with the UE;
identifying that the request has been granted and that the session has been established with the wireless telecommunications network; and
enforcing the AMBR across a plurality of sessions, the plurality of sessions including at least:
the session that was granted based on the request, and
at least one other session,
wherein enforcing the AMBR across the plurality of sessions includes causing a cumulative bit rate, of traffic transmitted via the plurality of sessions, to be at or below the AMBR specified by the AMBR group.

10. The method of claim 9, wherein enforcing the AMBR across the plurality of sessions includes:
enforcing the AMBR across a plurality of sessions that are associated with at least two different traffic types that are associated with the AMBR group.

11. The method of claim 9, wherein the AMBR group is associated with the UE and at least one other UE,
wherein enforcing the AMBR across the plurality of sessions further includes enforcing the AMBR across:
the session that was granted based on the request, and
at least one other session that is associated with the at least one other UE.

12. The method of claim 11, wherein the AMBR group is associated with a plurality of different traffic types, including the traffic type associated with the request,
wherein enforcing the AMBR across the plurality of sessions further includes enforcing the AMBR across:
the plurality of different traffic types,
the session associated with the UE, and
at least one other session associated with the at least one other UE.

13. The method of claim 9, wherein the traffic type is specified in the request as a Data Network Name ("DNN").

14. The method of claim 9, wherein the AMBR is a first AMBR and the traffic type is a first traffic type, the method further comprising:
identifying another session, associated with the UE, that is associated with a second traffic type that is not specified by the AMBR group;
identifying a second AMBR associated with the second traffic type; and
enforcing the second AMBR, for the second session, separately from the enforcement of the first AMBR.

15. The method of claim 9, wherein the plurality of sessions include two or more sessions between the wireless telecommunications network and the UE.

16. A non-transitory computer-readable medium, storing a set of processor-executable instructions, which, when executed by one or more processors of a device associated with a wireless telecommunications network, cause the one or more processors to:
receive information indicating that a user equipment ("UE") has requested that a session be established with the wireless telecommunications network;
identify a traffic type associated with the request;
identify an Aggregate Maximum Bit Rate ("AMBR") group associated with the traffic type, wherein the AMBR group specifies:
a plurality of traffic types, including the identified traffic type, and
an AMBR to be enforced for the plurality of traffic types;
identify that a particular Session Management Function ("SMF"), associated with the wireless telecommunications network, is handling traffic associated with the AMBR group;
cause, based on identifying that the particular SMF is handling traffic associated with the AMBR group, the particular SMF to be selected when establishing the session associated with the UE;
identify that the request has been granted and that the session has been established with the wireless telecommunications network; and
enforce the AMBR across a plurality of sessions, the plurality of sessions including at least:
the session that was granted based on the request, and
at least one other session,
wherein enforcing the AMBR across the plurality of sessions includes causing a cumulative bit rate, of traffic transmitted via the plurality of sessions, to be at or below the AMBR specified by the AMBR group.

17. The non-transitory computer readable medium of claim 16, wherein the processor-executable instructions, to enforce the AMBR across the plurality of sessions, causes the one or more processors to:
enforce the AMBR across a plurality of sessions that are associated with at least two different traffic types that are associated with the AMBR group.

18. The non-transitory computer readable medium of claim 16, wherein the AMBR group is associated with the UE and at least one other UE,
wherein the processor-executable instructions, to enforce the AMBR across the plurality of sessions, include processor-executable instructions to enforce the AMBR across:
the session that was granted based on the request, and
at least one other session that is associated with the at least one other UE.

19. The non-transitory computer readable medium of claim 18, wherein the AMBR group is associated with a plurality of different traffic types, including the traffic type associated with the request,
wherein the processor-executable instructions, to enforce the AMBR across the plurality of sessions, further processor-executable instructions to enforce the AMBR across:
the plurality of different traffic types,
the session associated with the UE, and
at least one other session associated with the at least one other UE.

20. The non-transitory computer-readable medium 16, wherein the plurality of sessions include two or more sessions between the wireless telecommunications network and the UE.

* * * * *